Patented Apr. 14, 1931

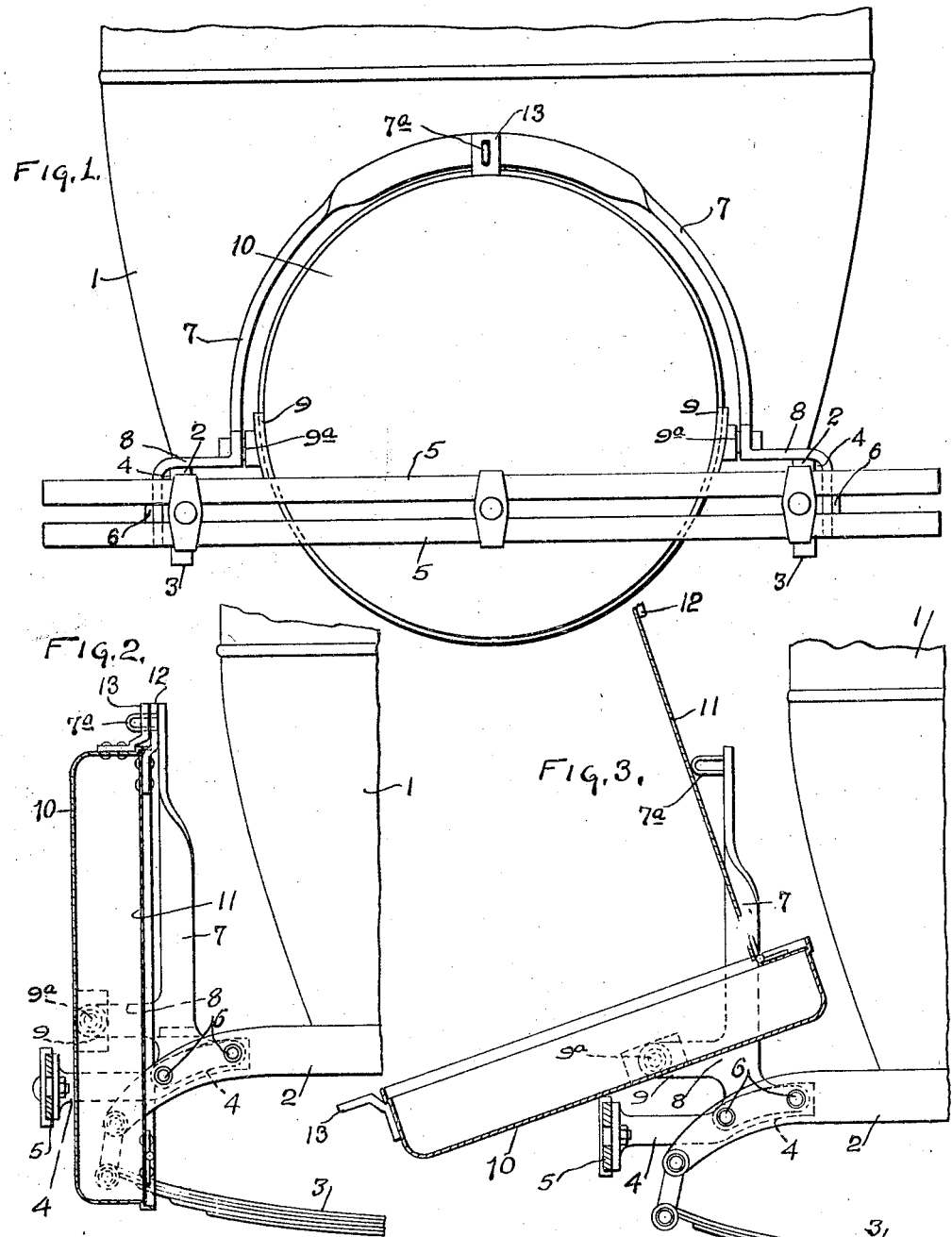

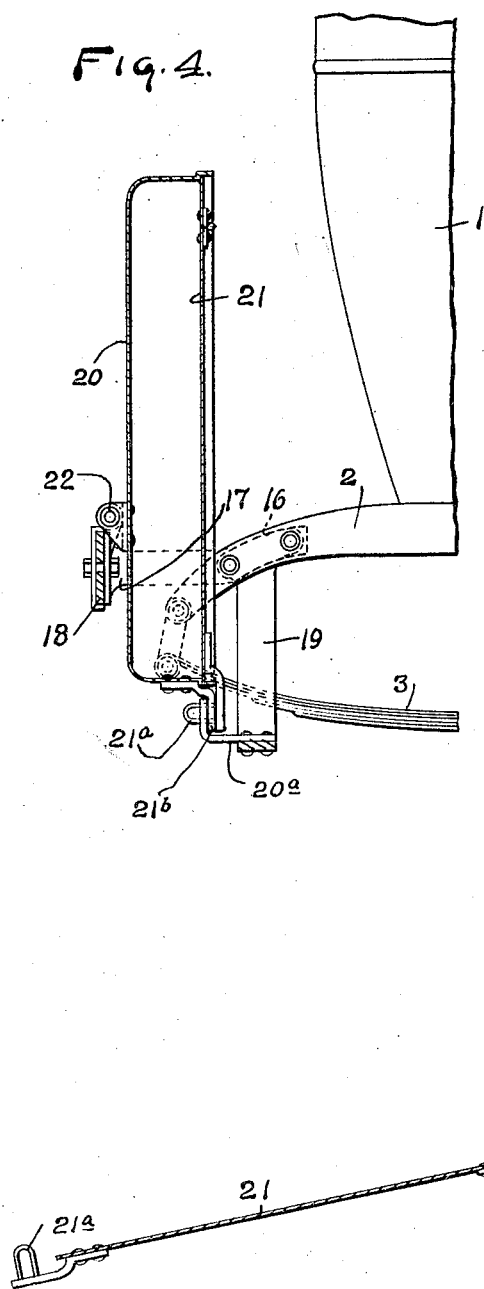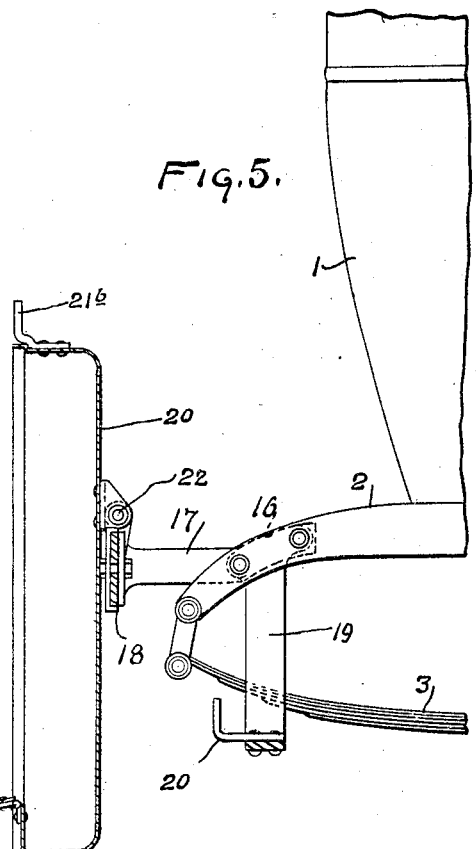

1,800,309

UNITED STATES PATENT OFFICE

EDWARD H. McCLOUD, OF COLUMBUS, OHIO, ASSIGNOR TO THE CENTRAL BRASS & FIXTURE COMPANY, OF SPRINGFIELD, OHIO, A CORPORATION OF OHIO

AUTOMOBILE TIRE CARRIER

Application filed December 27, 1927. Serial No. 242,843.

This invention relates to a tire carrier, and more specifically to a tire carrier so mounted that it is rendered very readily accessible for the loading and unloading of a tire.

The invention yet more particularly pertains to a tire carrier which is pivotally mounted so that the carrier may be moved about a pivot to assume a position which will render easy the mounting and demounting of a tire.

Referring to the drawings:

Figure 1 represents a rear elevation of an automobile body provided with a bumper and tire carrier in accordance with the present invention.

Figure 2 is a side elevation partially in section showing the carrier in normal position and closed.

Figure 3 is a side elevation partially in section showing the carrier rotated upon its pivot and open so that access may be had thereto.

Figure 4 is an elevation of a modified form of the invention, in this modification the carrier being mounted upon the bumper.

Figure 5 is an elevation similar to Figure 4 but showing the carrier rotated upon its pivot and open.

Referring more specifically to the drawings, it will be seen that 1 represents the body of the automobile provided with a chassis, a portion of which is shown at 2, and with springs 3.

Secured to the chassis side bars are brackets 4, and to these brackets is secured the bumper 5 by attaching means, as bolts, indicated at 6. Thus both ends of the bumper are securely mounted on the chassis.

An arch-shaped bar 7, which stands essentially vertical, as seen in Figures 2 and 3, terminates its lower ends in other brackets 8 which are secured to the chassis bars by the same bolts 6. The arch-shaped bar further has rearwardly extending portions 9 to which by means of pivots 9ª is secured a tire holder or container 10 either in the form of a casing, as shown, or otherwise.

This carrier has a cover 11 pivoted or hinged thereto, having a hasp 12 which with its staples 7ª constitutes one form of fastening means for securing the cover to the arch-shaped bar 7. The carrier 10 is also provided with a clasp 13 adapted likewise to engage with the staples 7ª, whereby the carrier may be secured in normal position for carrying the tire.

It will be seen that when access to the carrier 10 is desired, it is released from the fastening means and is caused to rotate about the point 9ª, and to come to rest against the bumper 5, which supports it.

In this position the tire is readily accessible for removal, and likewise the carrier is readily accessible for the application thereto of a tire. In what may be called the normal position of the carrier, such as shown in Figures 1 and 2, the carrier is protected by the bumper; while in this lowered or abnormal position the tire is easily reached for removal, and the carrier likewise readily reached for the mounting of the tire thereon as stated. It is this twofold position of the carrier, and its protection by the bumper when in the normal position, that I would emphasize as important or objective features of my invention.

Referring to the modification shown in Figures 4 and 5, it will be seen that the chassis 2 is provided with a bracket 16 having a horizontal arm 17 carrying the bumper 18 and a depending arm 19 at substantially right angles to the arm 17. The carrier 20, provided with a cover 21, is pivoted at 22 on the bumper 18. The arm 19 carries a hasp 20ª which is adapted to act as a means for securing the carrier 20 in normal closed position.

The cover 21 of the carrier is equipped with a staple 21ª adapted to pass through the hasp 20ª when the carrier is in normal or upright position, as seen in Figure 4, as also through a lug 21ᵇ secured to the carrier. In this way the carrier is secured in its normal position, but any other type of fastening device may be employed.

Any suitable locking means may be used in connection with this fastening device to prevent the carrier from being opened or swung from its normal to its abnormal position.

From Figure 5 it will be seen that the carrier 20 swings about the pivot 22 until it reaches the position shown in that figure. The cover 21 is then opened and rested against the ground.

In both forms of this invention it will be seen that there is provided a movable tire carrier, the bumper in this instance being fixed. In both forms of the illustrated invention, the carrier is movably mounted adjacent the said bumper.

It will now be understood that this invention comprehends the combination with an automobile of a protecting bumper mounted on the chassis, and a tire carrier adjustably connected to the chassis in such wise that it will occupy two positions, according to adjustment; one position being the normal one in which the carrier is supported in the upright carrying position, which is inconvenient for access to the carrier; and the other position one in which the carrier is moved from its normal position down to a position which is readily accessible for the mounting and demounting of a tire, without the objectionable necessity of the tire having to be lifted by the operator through the distance usually required to put on and remove the tire from the carrier. Thus, in the case of this invention, the tire carrier is capable of two positions, the normal or carrying position, and the abnormal to remove it from the carrying position and to place it in position for convenient and ready access without obstruction from the bumper, the bumper being preferably arranged so as to support the weight of the tire carrier when the same is in abnormal position; and yet the tire carrier is always attached to the vehicle by its mountings.

I believe myself to be the first to so mount an automobile tire carrier and therefore wish to be understood as broadly claiming what is here stated.

It will be understood that the specific forms of the invention illustrated in this application are illustrative in character only, the invention being capable of many different forms for accomplishing the same purpose, without departing from the inventive scope and concept herein indicated.

I desire to comprehend within my invention such modifications as may be clearly embraced within my claims and the scope of my invention.

Having thus fully described my invention, what I claim is new and desire to secure by Letters Patent, is:

1. In combination with an automobile chassis, a tire holder supported by said chassis, a cover for said tire holder, and means supported by said chassis adapted to engage the tire holder and the cover to lock said holder in vertical position and the cover in close relation with said holder.

2. In combination with an automobile chassis, an arch shaped bar vertically supported by said chassis, a tire holder pivotally supported by said bar, a cover for said tire holder, and means on said bar to engage said holder to lock the holder in upright position and the cover in engagement with the holder.

3. In combination with an automobile chassis, an arch shaped bar vertically supported by said chassis and having a pair of brackets thereon, a tire holder supported pivotally by said brackets, a cover for said tire holder, and means on said bar to engage the cover and the holder to support the holder in upright position and the cover in engagement with the holder.

4. In combination with an automobile chassis, a tire container pivotally supported by the chassis, a cover pivoted to the upper or front part of said container, and single means to engage the container and the cover to lock the cover to the container and support the two in upright position.

5. In combination with an automobile chassis and a bumper, a tire container and cover therefor pivotally supported by said chassis adapted to be turned down onto said bumper for opening the cover and the removal of the tire, and single means for locking the cover to the container and supporting the two in upright position.

In testimony whereof I affix my signature.

EDWARD H. McCLOUD.